Feb. 5, 1957 A. M. CROSWELL 2,780,194
INTERNAL BACK-UP CLAMP FOR GIRTH WELDING
Filed July 11, 1952 3 Sheets-Sheet 2
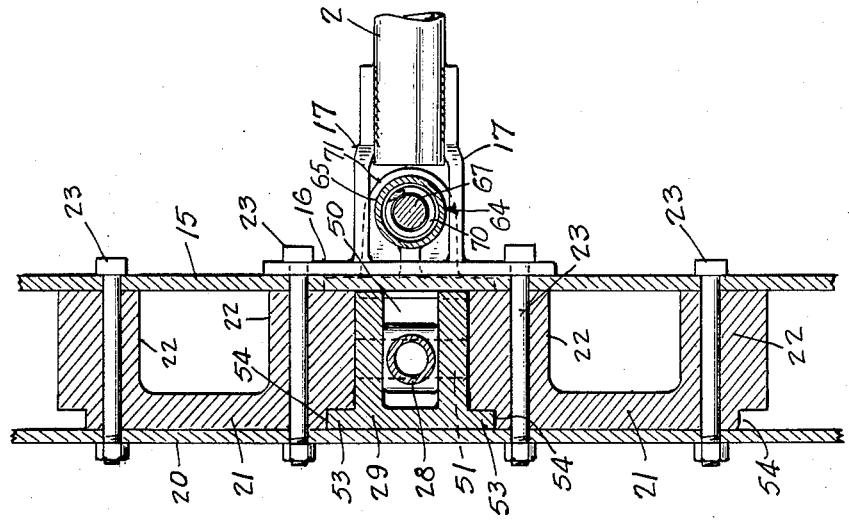
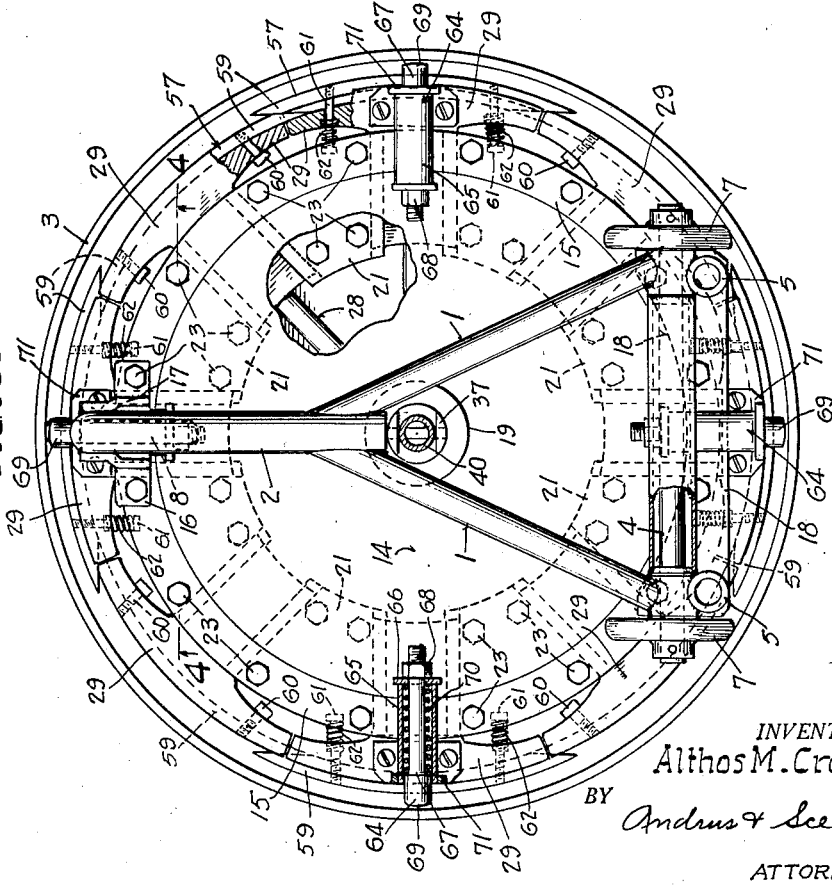
INVENTOR.
Althos M. Croswell
BY
Andrus & Scealey
ATTORNEYS.

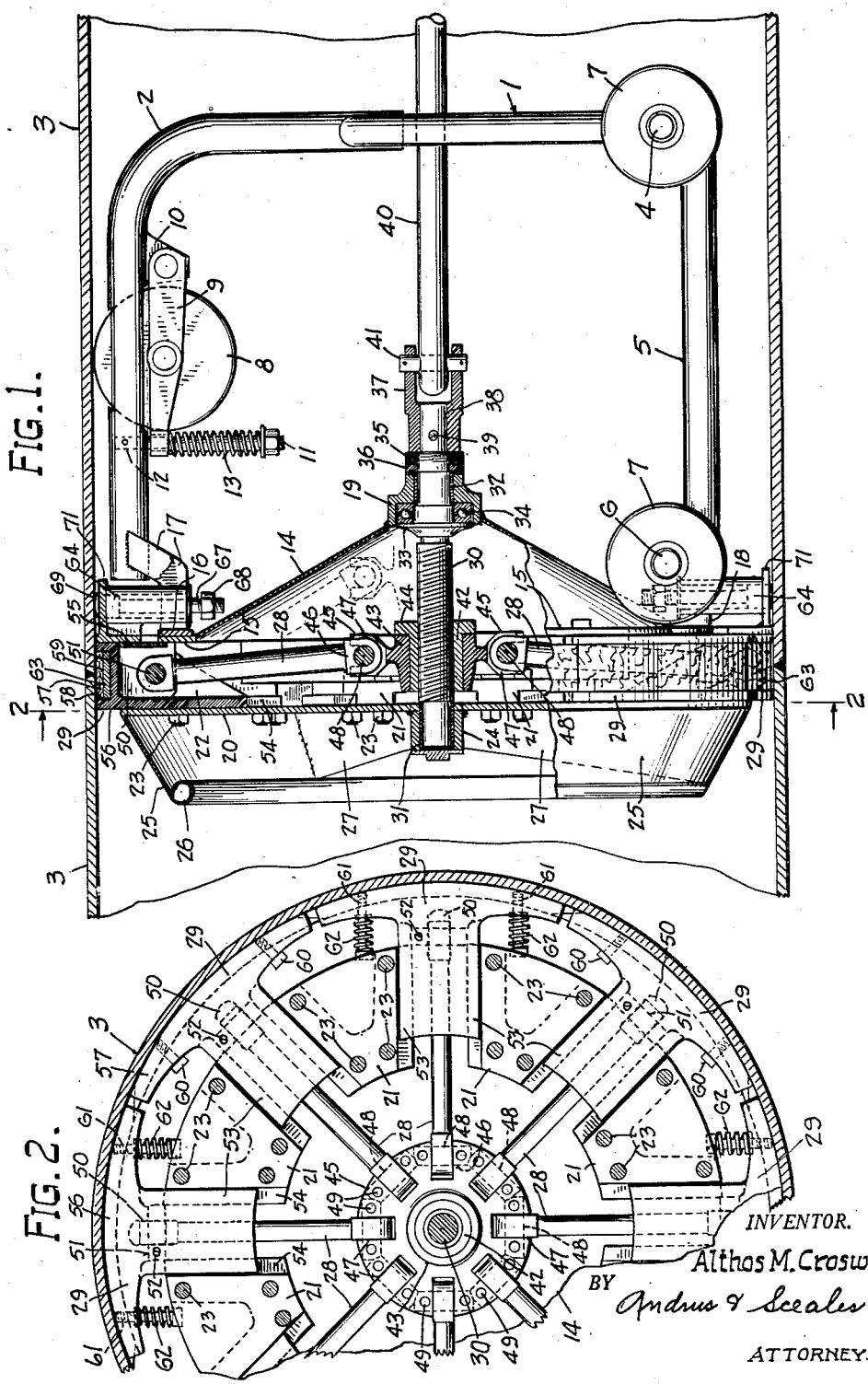

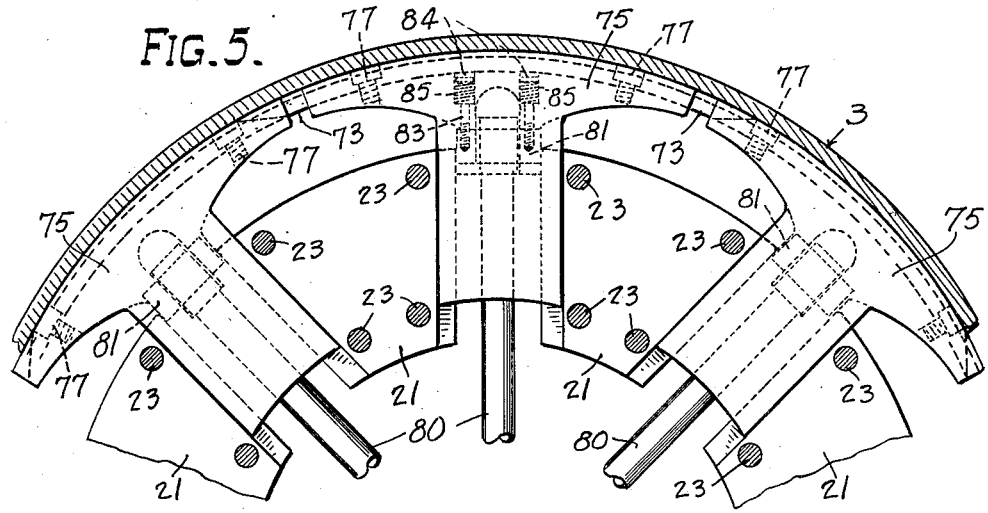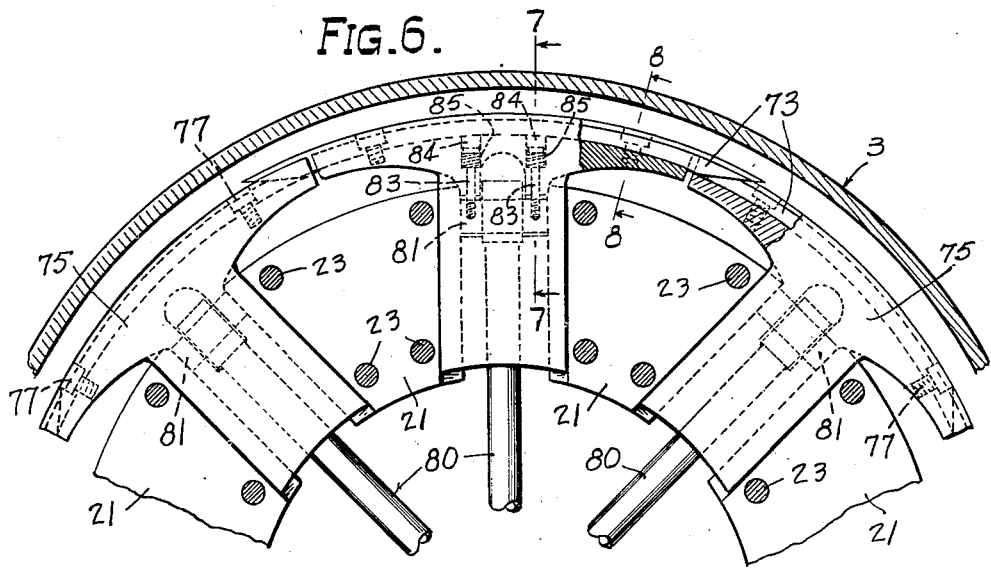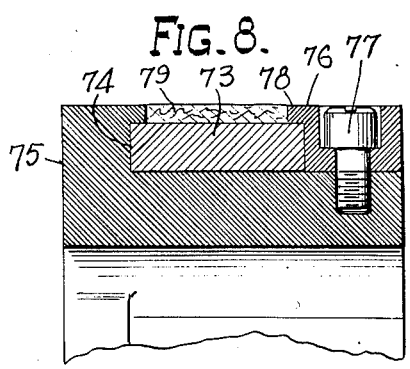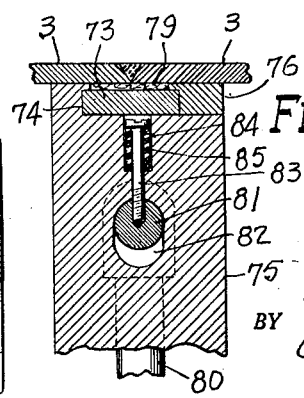
INVENTOR.
Althos M. Croswell
BY Andrus & Scales
ATTORNEYS.

United States Patent Office 2,780,194
Patented Feb. 5, 1957

2,780,194

INTERNAL BACK-UP CLAMP FOR GIRTH WELDING

Althos M. Croswell, Shreveport, La., assignor, by mesne assignments, to A. O. Smith Corporation, Milwaukee, Wis., a corporation of New York Application July 11, 1952, Serial No. 298,391

11 Claims. (Cl. 113—103)

This invention relates to a back-up clamp and more particularly to a welding alignment clamp for application to the underside of a girth joint between the adjacent ends of two tubular members, such as pipe sections, which are to be welded together.

An object of the present invention is to provide an internal clamp to be applied to the underside of a girth joint between the adjacent ends of two pipe sections which serves to maintain alignment of the pipe sections and also serves to support a back-up material for the molten weld metal.

Another object of the present invention is to provide an internal clamp which may be expanded radially into extremely firm contact with the pipe sections to be welded and radially collapsed after welding without circumferential movement or slippage of the clamp.

Another object is to provide an internal welding clamp having a segmental welding back-up ring or chill whereby the back-up chill segments are firmly supported by internal shoes when the clamp is in its expanded position.

Still another object is to provide a segmental chill ring for use with an internal welding clamp whereby alternate chill segments wedge between intermediate adjacent segments and the corresponding supporting shoes upon inward collapse of the clamp to permit contraction of the chill ring out of contact with the welded joint.

The present invention is directed to a lightweight, durable internal welding clamp for application to the underside of the joint between the adjacent ends of two pipe sections which are to be welded together. The apparatus serves to effectively align the circular pipe edges to be welded, and also provides a back-up chill for the weld deposit.

According to the present invention the apparatus comprises a movable frame or carriage having wheels or the like which ride on the inner surface of the pipe sections and enable the frame to be moved and positioned therewithin. The frame carries a plurality of circularly spaced toggle arms which are adapted to be expanded and contracted radially by means of a hand operated shaft.

Under one embodiment of the invention each toggle arm carries an arcuate shoe and each shoe in turn supports an arcuate segment of an expendable back-up or chill ring. The ring is adapted to bear against the underside of the joint between the pipe sections when the toggle arms are in the expanded position. The joints between adjacent segments of the ring are beveled and alternate segments are spring biased into contact with the corresponding shoe rather than being firmly fixed to the shoe as is the case with the adjacent intermediate segments so that on collapse or contraction of the toggle arms the beveled edges of the fixed intermediate segments will wedge between and underlap the alternate spring biased segments and permit the contraction of the segmental ring out of contact with the pipe sections.

Under the second embodiment of the invention illustrated in the drawings the chill segments are positively fastened to all the shoes and each alternate shoe is drawn inwardly on contraction of the apparatus before the intermediate adjacent shoes which are spring biased. This difference or lag in movement and the spring biasing of the intermediate shoes permits the beveled edges of each chill segment to slide against the beveled edges of adjacent chill segments and bring about a contraction of the chill ring to a lesser diameter.

Other objects and advantages of the invention will appear hereinafter in connection with the following description of the accompanying drawings.

In the drawings:

Figure 1 is a vertical sectional view of one embodiment of the invention with parts in elevation and showing the clamp in an expanded position within the pipe sections to be welded;

Fig. 2 is a transverse section taken on line 2—2 of Figure 1;

Fig. 3 is a rear end elevational view with parts broken away and sectioned and showing a clamp in collapsed position within the pipe sections;

Fig. 4 is an enlarged section taken along line 4—4 of Fig. 3;

Fig. 5 is a view, similar to Fig. 2, of another embodiment of the invention;

Fig. 6 is a similar view in the retracted position;

Fig. 7 is an enlarged section on line 7—7 of Fig. 6; and

Fig. 8 is an enlarged section on line 8—8 of Fig. 6.

Referring to the drawings there is shown an internal aligning clamp for use in girth welding the joint between the adjacent ends of two tubular metal articles such as pipe sections. The clamp is adapted to be expanded into contact with the underside of the joint between the adjacent ends of the pipe sections to position the same in proper welding alignment and to back up the molten weld metal during welding. The clamp comprises a movable frame which carries the expanding mechanism and includes a pair of diagonal tubular braces 1 having the upper ends thereof connected to the lower end of an L-shaped brace 2 at a point slightly upward of the axis of the pipe sections 3 into which the frame is to be disposed. Braces 1 diverge downwardly from brace 2 and a rear axle 4 is rotatably mounted in a housing secured between the lower extremities of braces 1.

The housing of axle 4 is braced by a pair of spaced longitudinally disposed tubular supports 5 having suitable transverse grooves therein which conform to the curvature of the axle housing and receive the same. The housing of forward axle 6 is similarly braced by connection to the forward ends of supports 5.

To facilitate movement of the frame within the pipe sections, wheels 7 are secured to the ends of axles 4 and 6 and ride on the inner surface of pipe sections 3.

The L-shaped brace 2 extends upwardly from the point of attachment with braces 1 and then longitudinally of the pipe sections toward the joint between the pipe sections. To maintain the frame in firm contact with the internal surface of pipe sections 3 in which it is inserted, the horizontal portion of brace 2 is provided with a longitudinal slit which receives a roller 8 which is urged outwardly into contact with pipe section 3. Roller 8 is rotatably secured to the central portion of a link 9 which is disposed beneath brace 2. One end of link 9 is pivotally attached to a lug 10 which in turn is welded to brace 2. The other end of link 9 is provided with a suitable opening which slidably receives a vertically disposed stud 11. The upper extremity of stud 11 extends within a suitable opening in brace 2 and is secured therein by pin 12.

The forward end of link 9 is urged upwardly toward brace 2 and the attached roller 8 is thus biased outwardly into contact with pipe section 3 by a spring 13 which is disposed about stud 11 and bears against link 9 and the head of the stud.

Dust and other foreign material is kept from contacting the moving parts of the expanding mechanism by means of a generally conical rear closure ring 14. Ring 14 is provided with annular outwardly extending base flange 15 to which brace 2 and supports 5 are connected.

A plate 16 is bolted flatwise to flange 15, and the forward ends of a pair of generally L-shaped brackets 17 are secured edgewise to plate 16. The rearward upwardly extending ends of brackets 17 straddle the forward end of brace 2 and are welded to the side portions thereof.

Tubular supports 5 are connected to ring 15 by a generally arcuate shaped plate 18 which is welded to the forward ends of supports 5 and is secured flatwise by suitable bolts to the flange 15 of ring 14.

The apex of the conical ring 14 faces rearwardly, away from the joint between pipe sections 3, and a generally cylindrical rear bearing housing 19 is welded within the apex opening of the ring 15.

A forward closure plate 20 is disposed forwardly of flange 15 of ring 14 and plate 20 and closure ring 14 define a chamber within which the expanding mechanism is contained. Plate 20 and ring 14 are connected by a plurality of circularly spaced guide blocks 21.

The forward face of each block 21 is disposed in a flatwise relation with plate 20 and the rear portion of each block 21 is provided with a generally V-shaped flange 22 which is in contact with flange 15 of ring 14. Bolts 23 serve to secure blocks 21 between plate 20 and flange 15.

Closure plate 20 is provided with a central axial opening that receives a forward shaft housing 24 which is welded to the plate within the opening.

To prevent damage to the apparatus when positioning the same within the pipe sections, the outer circular edge of plate 20 is spaced inwardly from pipe sections 3 and a generally conical ring 25 which is welded to plate 20 extends forwardly of the plate and carries a generally circular, tubular bumper 26.

Reinforcement is provided for ring 25 by a plurality of ribs 27 which extend radially outward from housing 24 along the outer surface of plate 20 and are secured to ring 25.

The expandable clamping mechanism carried by the frame consists, in general, of a plurality of toggle arms 28, each of which supports one of a plurality of shoes 29. The arms 28 are expanded outwardly by the rotation of a drive shaft 30 thereby forcing the shoes 29 into contact with the pipe sections to position the same in welding alignment.

The forward end of shaft 30 is journaled within a bearing 31 carried by the forward bearing housing 24, and the rearward portion of shaft 30 is journaled within a bearing 32 carried by rear bearing housing 19.

To prevent rearward movement of shaft 30, as the toggle arms 28 are expanded outwardly, the shaft is provided with an annular flange 33 adapted to bear against a thrust bearing 34 which is confined within an axial recess in housing 19, immediately adjacent bearing 32. The rearward thrust of shaft 30 is transmitted against thrust bearing 34 which in turn bears against the bottom of the axial recess in housing 19.

Shaft 30 may be moved relative to housing 19 in order to control the bearing pressure of flange 33 against thrust bearing 34 by means of an adjustable threaded nut 35. Nut 35 is longitudinally confined on shaft 30 by spacing washer 36, which bears against the rearward end of housing 19, and by clevis 37. Threading of nut 35 on shaft 30 will vary the position of flange 33 with respect to bearing 34 and thereby control the "play" or longitudinal movement of shaft 30.

To provide a means for rotating shaft 30 the rearward end of the shaft is received within the forward end of an axial recess 38 in the clevis 37 and secured therein by pin 39. A manual operating rod 40 is attached within the other end of recess 38 by a pin 41 and manual rotation of rod 40 will cause a corresponding rotation of shaft 30 within bearings 31 and 32. Rod 40 has a length approximately equal to that of one of the pipe sections 3 to be welded so that when the clamp is aligned internally behind the joint between pipe sections the free end of rod 40 will extend beyond the end of the pipe section within which it is disposed in position where it may easily be manipulated by the operator.

The central portion of shaft 30 between flange 33 and bearing 31 is externally threaded and is threadedly engaged by a flanged generally cylindrical insert nut 42. As shaft 30 is rotated through the operation of rod 40, nut 42 will move longitudinally on the shaft. The toggle arms 28 are interconnected to the nut 42 by means of a hub 43 which is disposed about nut 42 and bears against the rearward outwardly extending flange 44 thereof. Suitable bolts are employed to secure hub 43 to flange 44 of nut 42.

The central portion of hub 43 is provided with an annular outwardly extending bifurcated flange 45. A groove 46 extends between the prongs of the flange 45 and has a generally polygonal peripheral configuration.

The inner ends of toggle arms 28 are pivotally attached to hub 43. The flange 45 of hub 43 is provided with a plurality of circumferentially spaced radial recesses 47 which extend transversely through the flange. Each recess 47 receives the inner end of one of the toggle arms 28. Pivotal attachment of arms 28 within hub 43 is accomplished by means of a pivot pin 48 which extends through a suitable opening in each toggle arm 28 and rests within the polygonal groove 46 on one of the flat surfaces thereof. The inner end portions of each pin 48 are suitably beveled to permit the pins to fit in abutting relation within the groove 46.

Each pivot pin 48 is secured within groove 46 by a pair of smaller diameter retaining pins 49 which extend through suitably aligned openings in the prongs of flange 45 and pin 48. Pins 49 are located on either side of the corresponding toggle arm 28.

The outer end of each toggle arm 28 is pivotally connected to the corresponding shoe 29. Each shoe is provided with a central recess 50 which receives the outer extremity of the respective toggle arm 28 and pivotal attachment is achieved by a pin 51 which extends through suitable aligned openings in the side surfaces of shoe 29 and in toggle arm 28. Pin 51 is retained in position by a locking screw 52 which is threadedly engaged in a suitable aperture in the side surface of shoe 29. The tip of the screw 52 bears against pin 51 and serves to retain the same within the aligned openings.

Each shoe 29 is adapted to slide radially between plate 20 and flange 15 and the shoes are maintained in alignment during radial movement by providing the forward portion of each shoe with a pair of slide flanges 53 which are guided within guideways 54 formed in the forward radial edge portion of adjacent guide blocks 21. The forward surface of shoe 29 is in contacting relation with supporting plate 20 and is adapted to slide thereagainst with the flanges 53 being retained and guided within the guideways 54 during the sliding movement of the shoe.

The open rearward end of the recess 50 in each shoe 29 is enclosed by a back plate 55 which is adapted to slide against flange 15 as the shoes are moved radially by toggle arms 28.

Back plate 55 is constructed with a shorter length than the forward surface of the corresponding shoe so as to permit free unobstructed movement of toggle arm 28. As a consequence the inner edges of the side surfaces of shoes 29 are cut diagonally to connect the longer forward surface of the shoe to the shorter back plate 55.

The outer portion of each shoe 29 is provided with a generally arcuate head 56 which is formed with an outer curvature conforming to the contour of the pipe sections 3 to be welded. The arcuate head 56 of each shoe extends circumferentially in either direction beyond the main body portion of the shoe, and when the shoes are in the inward or collapsed position, see Fig. 3, the transverse edges of each head are in substantial contact with the transverse edges of adjacent heads so that the shoes 29 appear to be one continuous integral supporting ring. When the shoes 29 are in the outward expanded position, as in Fig. 2, the transverse edges of each head 56 are circumferentially spaced from the corresponding edges of adjacent heads with a slight gap therebetween.

A segmental chill ring 57 is carried by shoes 29 and disposed beneath the underside of the joint between pipe sections 3. Chill ring 57 serves to support the molten weld metal during the welding operation. Each head 56 is provided with a peripheral groove 58 which receives an arcuate chill segment 59 of the chill ring 57. Chill segments 59 are generally rectangular in cross section and have a width approximating that of groove 58 so as to fit snugly therein. The thickness of chill sections 59 is slightly less than the depth of the groove 58 so that the chill will be depressed beneath the outer surface of the head 56.

The transverse edges of each chill segment 59 are deeply beveled as shown in Fig. 3. The beveled edges of each alternate chill segment 59 diverge inwardly toward the body portion of the corresponding shoe to which they are fixedly attached. In distinction the beveled edges of each adjacent intermediate segment converge inwardly away from the body portion of the shoe to which they are resiliently attached.

This construction permits each alternate segment 59 to be withdrawn radially relative to the intermediate segments, as the chill ring is collapsed, with the beveled edges of one segment sliding against the beveled edges of the adjacent segment during the radial movement.

In the expanded position the transverse edges of adjacent heads 56 are separated with a gap therebetween, but the beveled edges of the chill segments 59 overlap to form aligned scarf joints between segments. As seen in Fig. 2 the underside of the scarf joints between chill segments are fully supported by the heads 56 of shoes 29. Thus the weakest portions of the chill rings, namely the joints between chill segments, are rigidly supported. This factor enables greater pressure to be applied outwardly in a more uniform manner against the pipe sections and results in more accurately aligned pipe sections without any danger of distortion or bending of the chill segments.

In the inward or collapsed position of the shoes the transverse edges of adjacent heads 56 are in substantial contacting relation, as shown in Fig. 3. However, the beveled edges of the chill segments 59, in the collapsed position, are further overlapped with adjacent segments being radially offset to provide a chill ring of lesser diameter. In this collapsed position all of the chill segments are disposed inwardly out of contact with the pipe sections so that the apparatus may be withdrawn from the same.

To bring about this required decrease in diameter of chill ring 57 when the apparatus is collapsed, each alternate chill segment 59 is firmly secured to head 56 within groove 58 by a pair of bolts 60 while each adjacent intermediate chill segment is merely biased to head 56 of the corresponding shoe by bolts 61 and springs 62. Springs 62 encircle the stems of bolts 61 and extend between the head of the respective bolts and the inner surface of the respective shoe heads 56. Springs 62 tend to urge the chill segments into contact with the corresponding shoes.

As the shoes 29 are moved radially inwardly out of contact with pipe sections 3 the beveled end of each alternate fixed segment 59 wedges between the adjacent intermediate shoe and the corresponding spring biased segment of adjacent segments with the beveled edges sliding against each other during this wedging action. As shown in Fig. 3 the fixed chill segments wedge between the adjacent spring biased chill segment and the corresponding shoe a sufficient distance to permit the chill ring to maintain its relative position with respect to the collapsed shoes.

To properly form the weld head at the joint and eliminate any problem of the chill ring sticking to the weld, a flexible inert backing strip 63 may be disposed on the outer surface of the chill ring. To align strip 63 beneath the joint between pipe sections, strip 63 is disposed circumferentially about chill ring 57 and within groove 58 in a manner such that the outer surface of strip 63 projects a slight distance beyond the outer surface of head 56. The strip 63 is preferably a single continuous piece which is wrapped around the chill ring 57 and suitably secured when the ring is collapsed. It is desirable that the strip 63 have sufficient resiliency to enable it to stretch when the chill ring is expanded to its outward supporting position.

A plurality of auxiliary clamps 64 are associated with shoes 29 and may be employed to initially position and prevent movement of the frame within the pipe sections 3 before the shoes 29 are expanded outwardly into contact with the pipe sections. The auxiliary clamps 64 may be similar to that described and claimed in the co-pending application of Julius Tiedemann, Serial No. 298,392, filed July 11, 1952, entitled Internal Alignment Clamp for Girth Welding, and assigned to the same assignee as the present application.

However, as shown in the embodiment herein disclosed, each clamp 64 comprises a generally cylindrical housing 65 which is enclosed at the inner end by a circular base plate 66. Housing 65 receives a stud 67, and the threaded lower end of stud 67 extends through a suitable opening in base plate 66 and is engaged by an adjustable nut 68. The upper end of stud 67 is enlarged to provide a head 69 having a diameter slightly less than the inner diameter of housing 65. Head 69 is adapted to slidably move within casing 65 and has a generally curved outer surface which is adapted to contact one of the pipe sections 3.

Stud 67 is normally urged outwardly by a spring 70 which encircles the central portion of stud 67 and bears between plate 66 and head 69. Thus head 69 normally projects outwardly of casing 65 due to the force of spring 70.

As shown in Fig. 3 there are four clamps 64, with one of the clamps being connected to each alternate shoe 29 by means of a generally L-shaped bracket 71. The upper portion of housing 65 of each clamp 64 is secured within a suitable opening in the rearwardly extending portion of bracket 71 while the radially extending portion of each bracket is secured by bolts 72 to the rearward surface of the respective shoe 29.

When the apparatus is in the collapsed position with the shoes out of contact with the pipe sections, heads 69 of studs 67 are biased outwardly beyond the outer surface of the corresponding shoe head 56 by springs 70.

The apparatus, in the collapsed position, is inserted within one of the pipe sections 3 to be welded with the backing strip 63 properly aligned behind the edge of the pipe. The toggle arms 28 are partially expanded by operation of rod 40 until the projecting stud heads 69 are in contact with the pipe section. At this time the shoes are not in contact with the pipe sections but the apparatus will be prevented from moving and maintained in alignment by the pressure of stud heads 69 against the pipe section.

The second pipe section is then brought into proper end-to-end relation with the first section so that backing strip 63 is aligned behind the joint between the adjacent ends of the pipe sections. The toggle arms 28 are then further expanded causing shoes 29 to move outwardly into contact with the pipe sections. As shoes 29 move outwardly, stud heads 69 are forced inwardly against the force of spring 70 until the heads 69 are generally flush with the outer end of casing 65, and both the stud heads 69 and shoes 29 are in contacting relation with the pipe sections 3. The outward movement of the shoes 29 also causes chill ring 57 to expand and backing strip 63 is brought into contact with the joint between pipe sections.

As the toggle arms 28 and shoes 29 merely move radially, without any circumferential movement or slippage, a powerful expansion stroke is possible so that the outer surface of shoe heads 56 are brought into firm contact with the portion of the pipe sections 3 bordering the joint therebetween and accurately align the circular abutting edges thereof. Complete radial movement of the shoes 29 is made possible by the beveled edge construction of the chill segments 59 and by the wedging action between adjacent segments during the collapsing operation which permits the chill ring 57 to contract to a smaller diameter.

The beveled edges forming the scarf joint between adjacent chill segments 59 are fully supported from within by the respective shoes 29 when the chill ring is in the outwardly expanded position. This means that a more firm and uniform internal pressure may be exerted against the pipe sections 3 during the welding operation.

After the welding operation has been completed the operator turns shaft 40 in the opposite direction causing toggle arms 28 and shoes 29 to move inwardly. As shoes 29 move inwardly the beveled edges of alternate chill segments 59 wedge between the intermediate adjacent segments and the corresponding shoe to permit the chill ring 57 to be contracted inwardly out of contact with the pipe sections. The apparatus may then be withdrawn from the pipe sections.

A modification of the present invention is shown in Figs. 5, 6, 7 and 8. In this embodiment the arcuate chill segments 73, corresponding to chill segments 59 of the first embodiment, are each disposed in a longitudinal recess 74 formed in the outer periphery of the heads of shoes 75, which correspond to shoes 29. The side of each recess 74 is enclosed by a keeper bar 76 which is removably secured to shoe 75 by bolts 77.

Chill segments 73 are retained within recess 74 by lips 78 formed in shoe 75 and bar 76 respectively. Lips 78 overhang the recess 74 and prevent outward movement of the chill segment 73.

The transverse edges of each chill segment 73 are beveled with the transverse edges of the fixed alternate segments diverging inwardly toward the body portion of the corresponding shoe 75 to which they are attached and the transverse edges of resiliently mounted intermediate adjacent segments converging inwardly. This construction permits each alternate segment to be withdrawn radially relative to the intermediate adjacent segments.

A flexible backing strip 79 may be disposed about chill segments 73 in the space bordered by lips 78.

The shoes 75 are pivotally connected to toggle arms 80, corresponding to arms 28, by pins 81 which correspond to pins 51. While each alternate pin 81 is secured against movement within the openings in the side walls of the respective shoes in which the pin is located, each intermediate adjacent pin 81 is free to move radially within the opening 82 in the respective shoe 75 in which such pin is located due to the elongated or slotted configuration of each opening 82.

As seen in Fig. 7 where a slotted shoe is shown, opening 82 is of substantially greater size in radial dimension than the diameter of the contained pin 81 so that the pin may move radially therein. The intermediate pin 81 contained in the slotted opening 82 is secured against longitudinal movement by a pair of retaining screws 83 which extend inwardly through counterbored holes 84 in the head of the respective shoes 75 and have the lower ends thereof threadedly engaged within suitable apertures in pins 81. Pin 81, as seen in Fig. 7, is urged outwardly within slotted opening 82 toward the head of shoe 75 by means of spring 85 which encircles the stem of screw 83 and bears between the head of screw 83 and the bottom of the counterbored portion of aperture 84.

In the expanded position of the apparatus the beveled transverse edges of each chill segment 73 are in contacting relation with the beveled transverse edges of adjacent segments. To collapse the apparatus the toggle arms 80 are drawn inwardly which results in the alternate shoes 75 being positively moved inwardly. At the same time the intermediate shoes 75 containing the slotted pin openings 82 are yieldably moved inwardly with the inward motion of the toggle arms due to the yielding connection between the pin and shoe, for the inward motion of toggle arms 80 results in the pin 81 being drawn inwardly within slotted opening 82 against the force of spring 85. Springs 85 thus tend to hold the chill segment 73 of shoes 75 in tight overlapping engagement as the clamp is collapsed.

As the alternate shoes tend to move inwardly on collapse of the apparatus before the intermediate adjacent shoes, the beveled transverse edges of the alternate shoes slide inwardly against the adjacent beveled edges of the intermediate shoes during this time lag and in effect bring about a contraction of the chill ring to the smaller diameter required to remove the apparatus from the pipe sections. The spring 85 insures that the shoe will withdraw from the pipe and bias overlapping ends of the chill ring segments together so that one yield against the other as the shoes are withdrawn.

The invention provides a chill ring and back-up clamp which can be radially powered without slippage due to the tapered construction of the chill ring. The spring biasing of the chill ring whether it be directly as in the first embodiment or indirectly as in the second embodiment insures withdrawal of the segments of the ring from the pipe and slippage of the tapered ends of the ring, one upon the other, as the clamp is collapsed.

Various embodiments of the invention may be employed within the scope of the accompanying claims.

I claim:

1. In an internal aligning clamp for use in welding the joint between adjacent ends of two tubular sections disposed in an end-to-end relation, a frame adapted to be disposed within said tubular sections and having a longitudinal axis substantially coincident with the longitudinal axis of the tubular sections, a plurality of circumferentially spaced supporting shoes disposed within the tubular sections about said frame axis, a radially extending arm connected to each of said shoes and extending inwardly toward the frame axis, means disposed at the frame axis and connected to the inner ends of said arms to simultaneously actuate the arms outwardly and inwardly relative to the frame axis and thereby move the shoes radially into and out of contact with the joint between the pipe sections, an arcuate chill segment mounted on the outer surface of each shoe and adapted to be aligned with the joint between the tubular sections, each alternate chill segment having inwardly diverging transverse edges in lapping contacting relation with inwardly converging transverse edges provided on adjacent intermediate segments to form a substantially circular chill ring and effect radial movement of the chill, means associated with said shoes for effecting expansion of the chill ring to greater diameter as the shoes move outwardly and contraction of the chill ring to lesser diameter as the shoes move inwardly, and spring means associated with each shoe corresponding to the chill segment having converging edges and biasing the overlapping edges of the chill segments together for yielding engagement between the edges as the edges are contracted to effect slippage between the segments at the overlapping edges thereof.

2. In an internal aligning back-up clamp for application across the inside of a joint between adjacent ends of tubular sections to be welded together, a plurality of circumferentially spaced shoes, a toggle arm pivotally secured to each shoe and extending inwardly therefrom, means to simultaneously actuate the toggle arms outwardly and inwardly and thereby move the shoes radially into and out of contact with the tubular sections to be welded, an arcuate shaped chill segment mounted on the outer surface of each shoe and adapted to be aligned with the joint between tubular sections, each alternate chill segment having inwardly diverging transverse edges in lapping contacting relation with inwardly converging transverse edges provided on adjacent intermediate chill segments, said chill segments having inwardly diverging edges being rigidly secured to the corresponding shoes, and spring means yieldably connecting the intermediate chill segments having inwardly converging edges to the corresponding shoes to bias the overlapping edges of the chill segments together as the segments are moved radially by the toggle arms to permit slippage between the segments at the overlapping edges thereof.

3. An internal aligning clamp for use in welding the joint between adjacent ends of two pipe sections disposed in an end-to-end relation, which comprises a frame adapted to be disposed within said pipe sections, a plurality of circumferentially spaced members connected to said frame and adapted to be moved radially outwardly and inwardly, a supporting shoe secured to each of said members and adapted to bear against the pipe sections on either side of the joint therebetween when said members are moved outwardly, an arcuate chill segment mounted on the outer surface of each shoe and adapted to be aligned with said joint, each alternate segment of said chill segments having inwardly diverging edges on each end disposed in lapping contacting relation with inwardly converging edges on each end of adjacent segments to form a substantially endless chill ring, means rigidly securing each alternate segment having inwardly diverging edges to the corresponding shoe of said segment, and spring means connecting the intermediate chill segments having inwardly converging edges to the corresponding shoes to bias said segments into contact with said shoes and thereby enable the transverse edges of the segments rigidly fixed to said shoes to wedge between the biased adjacent segments and the shoe of said last named segment and effect contraction of said chill ring to a lesser diameter as the shoes are moved inwardly by the circumferentially spaced members.

4. An internal aligning clamp for use in welding the joint between adjacent ends of two pipe sections disposed in and end-to-end relation, which comprises a frame adapted to be disposed within said pipe sections, a plurality of circumferentially spaced radially movable members connected to said frame and adapted to be moved outwardly and inwardly, a supporting shoe carried by the outer end of each of said members and adapted to bear against the pipe sections on either side of the joint therebetween when said members are moved outwardly, means mounted on said frame for guiding said shoes in radial movement as the members move radially, an arcuate chill segment mounted on the outer surface of each shoe and adapted to be aligned with said joint, each alternate segment of said chill segments having inwardly diverging edges on each end disposed in lapping contacting relation with inwardly converging edges on each end of adjacent segments to form a substantially endless chill ring, means rigidly securing each alternate segment having inwardly diverging edges to the corresponding shoe of said segment, and spring means connecting the intermediate chill segments having inwardly converging edges to the corresponding shoes to bias said segments into contact with said shoes and thereby enable the transverse edges of the segments rigidly fixed to said shoes to wedge between the biased adjacent segments and the shoe of said last named segment and effect contraction of said chill ring to a lesser diameter as said shoes are moved radially inward by the circumferentially spaced members.

5. An internal aligning clamp for use in welding the joint between adjacent ends of two pipe sections disposed in an end-to-end relation, which comprises a frame adapted to be disposed within said pipe sections, a rotatable drive shaft carried by said frame, a threaded hub disposed on said shaft for movement longitudinally of the shaft as the shaft is rotated, a plurality of circumferentially spaced toggle arms having the inner ends thereof interconnected with said hub and adapted to be simultaneously moved outwardly and inwardly in accordance with movement of said hub, a generally arcuately shaped supporting shoe secured to the outer end of each toggle arm and adapted to bear against the pipe sections on either side of said joint when the toggle arms are moved outwardly, each of said shoes being provided with an outer peripheral slot adapted to be disposed in alignment with the underside of said joint, an arcuate chill segment carried by each shoe within the slot therein, each alternate segment of said chill segments having inwardly diverging edges on each end disposed in lapping contacting relation with inwardly converging edges on each end of adjacent segments to form a substantially circular chill ring, means rigidly securing each alternate segment having inwardly diverging edges to the shoe of said segment, spring means connecting the intermediate chill segments having inwardly converging edges to the corresponding shoes to bias said segments into contact with said shoes and thereby enable the transverse edges of the segments fixed to said shoes to wedge between the adjacent biased segment and the shoe of said biased segment to effect a contraction of said chill ring to a lesser diameter as said shoes are moved inwardly by said toggle arms, and an inert flexible backing strip disposed around said chill segments and adapted to bear against the underside of the joint between pipe sections and support the molten weld metal during welding.

6. An internal aligning clamp for use in welding the joint between adjacent ends of two pipe sections disposed in an end-to-end relation, which comprises a frame adapted to be disposed within said pipe sections, a rotatable drive shaft carried by said frame, a threaded hub disposed on said shaft for movement longitudinally of the shaft as the shaft is rotated, a plurality of circumferentially spaced toggle arms having the inner ends thereof interconnected with said hub and adapted to be simultaneously moved outwardly and inwardly in accordance with movement of said hub, a generally arcuate shaped supporting shoe carried by the outer end of each toggle arm and adapted to bear against the pipe sections on either side of said joint when the toggle arms are moved outwardly, each of said shoes being provided with an outer peripheral slot adapted to be disposed in alignment with the underside of said joint, a chill ring having an arcuate chill segment carried by each shoe within the slot in said shoe, each alternate segment of said chill segments having inwardly diverging edges on each end disposed in lapping contacting relation with inwardly converging edges on each end of adjacent intermediate segments, means positively securing each alternate shoe to a toggle arm whereby inward movement of the toggle arm from the outermost position effects a positive inward movement of each alternate shoe, and a yielding connection securing each intermediate shoe to the corresponding toggle arm for said shoe to provide last motion therebetween and permit movement of each alternate shoe inwardly ahead of each intermediate shoe, said movement of the shoes enabling the beveled edges of each intermediate chill segment to slide over the beveled edges of an adjacent chill segment and effect a contraction of the chill ring to a lesser diameter.

7. An internal aligning clamp for use in welding the joint between adjacent ends of two pipe sections disposed in an end-to-end relation, which comprises a frame adapted to be disposed within said pipe sections, a rotatable drive shaft carried by said frame, a threaded hub disposed on said shaft for movement longitudinally of the shaft as the shaft is rotated, a plurality of circumferentially spaced toggle arms having the inner ends thereof interconnected with said hub and adapted to be simultaneously moved outwardly and inwardly in accordance with movement of said hub, a generally arcuate shaped supporting shoe carried by the outer end of each toggle arm and adapted to bear against the pipe sections on either side of said joint when the toggle arms are moved outwardly, each of said shoes being provided with an outer peripheral slot adapted to be disposed in alignment with the underside of said joint, a chill ring having an arcuate chill segment carried by each shoe within the slot in said shoe, each alternate segment of said chill segments having inwardly diverging edges on each end disposed in lapping contacting relation with inwardly converging edges on each end of adjacent intermediate segments, means positively securing each alternate shoe to a toggle arm whereby inward movement of the toggle arm from the outermost position effects positive inward movement of each alternate shoe, springs securing each intermediate shoe to the toggle arm for said shoe to provide lost motion therebetween and permit movement of each alternate shoe inwardly ahead of the intermediate shoe, said springs biasing the chill segment secured to each intermediate shoe into engagement with the beveled edge of the chill segment of an alternate shoe in effecting contraction of the chill ring to a lesser diameter.

8. An internal aligning clamp for use in welding the joint between adjacent ends of two pipe sections disposed in an end-to-end relation, which comprises a frame adapted to be disposed within said pipe sections, a rotatable shaft carried by said frame, a threaded hub disposed on said shaft for movement longitudinally of the shaft as the shaft is rotated, a plurality of circumferentially spaced toggle members having the inner ends thereof interconnected with said hub and adapted to be simultaneously moved outwardly and inwardly in accordance with movement of said hub, a generally arcuately shaped supporting shoe carried by the outer end of each toggle member and adapted to bear against the pipe sections on either side of said joint when said members are moved outwardly, each of said shoes being provided with an outer peripheral slot adapted to be disposed in alignment with the underside of said joint, an arcuate chill segment carried by each shoe within the slot therein, each alternate chill segment having inwardly diverging transverse edges in lapping contacting relation with inwardly converging transverse edges of the adjacent intermediate segments to form a substantially circular chill ring, and a connecting member pivotally connecting each shoe to the corresponding toggle member for said shoe, each connecting member associated with alternate shoes being secured against radial movement relative to the respective shoes and each connecting member associated with intermediate adjacent shoes being permitted limited lost motion to move radially relative to the respective shoes, the inward movement of said toggle members from the outermost position permitting the alternate shoes to initially move inwardly a distance corresponding to the lost motion before said intermediate shoes move inwardly and thereby enable the beveled edges of each of said chill segments carried by said alternate shoes to slide against the beveled edges of adjacent segments carried by said intermediate shoes and effect a contraction of said chill ring to a lesser diameter.

9. An internal aligning clamp for use in welding the joint between adjacent ends of two pipe sections disposed in an end-to-end relation comprising a frame adapted to be disposed within said pipe sections, a plurality of circularly spaced radially movable members connected to said frame and adapted to be moved outwardly and inwardly, a supporting shoe carried by each of said members and adapted to bear against the pipe sections on either side of the joint therebetween when said members are moved outwardly, means mounted on said frame for guiding said shoes in radial movement as the radially movable members are moved, an arcuate chill segment mounted on the outer surface of each shoe and adapted to be aligned with said joint, each alternate chill segment having inwardly diverging transverse edges disposed in lapping contacting relation with inwardly converging transverse edges of adjacent intermediate segments to form a substantially circular chill ring, and a connecting member pivotally connecting each shoe to the corresponding radially movable member, each connecting member associated with alternate shoes being secured against radial movement relative to the respective shoes and each connecting member associated with intermediate adjacent shoes being disposed in a slot provided in the corresponding radially movable members and yieldably secured to the shoes to provide limited lost motion between said members and the intermediate shoes and permit relative radial movement therebetween, the inward movement of said radially movable members from the outermost position initially moving said alternate shoes inwardly a distance corresponding to the lost motion between said members and the intermediate shoes before said intermediate shoes move inwardly and thereby enable the beveled edges of each of said chill segments carried by said alternate shoes to slide against the beveled edges of adjacent segments carried by said intermediate shoes and effect a contraction of said chill ring to a lesser diameter.

10. In a back-up clamp for application across the inside of a joint between adjacent ends of pipe sections to be welded together, comprising a frame adapted to be disposed within said pipe sections and having a longitudinal axis substantially coincident with the longitudinal axis of the pipe sections, a plurality of shoe members spaced circumferentially about said frame axis, a radially extending arm connected to each of said shoe members and extending inwardly toward the frame axis, means disposed at the frame axis and connected to the inner ends of said arms to simultaneously actuate the arms outwardly and inwardly relative to the frame axis and thereby move the shoe members radially into and out of contact with the joint between the pipe sections, an arcuate shaped chill segment mounted on the outer surface of each shoe member with each alternate chill segment having inwardly diverging end surfaces and the intermediate chill segments having inwardly converging end surfaces, said alternate chill segments having inwardly diverging end surfaces being rigidly secured to the corresponding shoe members with the end surfaces of said alternate segments being disposed in overlapping contacting relation to the end surfaces of the intermediate segments when the shoe members of the respective segments are in their extending position to form a circular chill ring, and spring means disposed between said intermediate chill segments and their corresponding shoe members to yieldingly mount said intermediate segments on the shoe members and thereby enable the ends of the alternate segments to slide between the intermediate segments and their corresponding shoe members to effect further overlap of the segments as the shoes are moved inwardly by the arms to a lesser diameter.

11. In a back-up clamp for application across the inside of a joint between adjacent ends of pipe sections to be welded together, comprising a frame adapted to be disposed within said pipe sections and having a longitudinal axis substantially coincident with the longitudinal axis of the pipe sections, a plurality of shoe members spaced circumferentially about said frame axis and adapted to be moved radially inwardly and outwardly with respect to said frame axis, an arcuate shaped chill segment fixedly secured on the outer surface of each shoe member with each alternate chill segment having inwardly diverging end surfaces and the intermediate chill segments having inwardly converging end surfaces, the end surfaces of said alternate segments being disposed in overlapping contacting relation with the end surfaces of the intermediate segments when the shoe members of the respective segments are in their radially extended position to form a circular chill ring, an arm member extending radially inwardly toward the frame axis from each of said shoe members, each of said members corresponding to the intermediate chill segments being provided with a radial slot connecting means positively securing the alternate arms to the shoe members corresponding to the alternate chill segments, yieldable connecting means disposed in the radial slot of each member corresponding to the intermediate chill segments to yieldably secure said arms to the shoe members corresponding to the intermediate chill segments with said slot providing lost motion between the intermediate arms and the corresponding shoe members, means disposed at the frame axis and connected to the inner ends of said arms to simultaneously actuate the arms outwardly and inwardly relative to the frame axis and thereby move the chill segments radially into and out of contact with the joint between the pipe sections, the inward movement of said arms from the expanded position initially moving said alternate shoe members inwardly a distance corresponding to the lost motion provided by said radial slots before said intermediate shoe members move inwardly and thereby enable the end surfaces of each of said chill segments carried by said alternate shoe members to clear the edge surfaces of the intermediate shoe members.

References Cited in the file of this patent

UNITED STATES PATENTS

| | | |
|---|---|---|
| 1,322,944 | Pierce | Nov. 25, 1919 |
| 1,642,825 | Pearce | Sept. 20, 1927 |
| 1,696,455 | Rupley | Dec. 25, 1928 |
| 1,884,144 | Norquist | Oct. 25, 1932 |
| 1,964,926 | Moss | July 3, 1934 |
| 2,339,543 | Bishop | Jan. 18, 1944 |
| 2,413,103 | Forbes | Dec. 24, 1946 |
| 2,452,867 | Price et al. | Nov. 2, 1948 |
| 2,501,893 | Dudley | Mar. 28, 1950 |
| 2,558,360 | Jadoul | June 26, 1951 |
| 2,655,977 | Hodgkins | Oct. 20, 1953 |